UNITED STATES PATENT OFFICE.

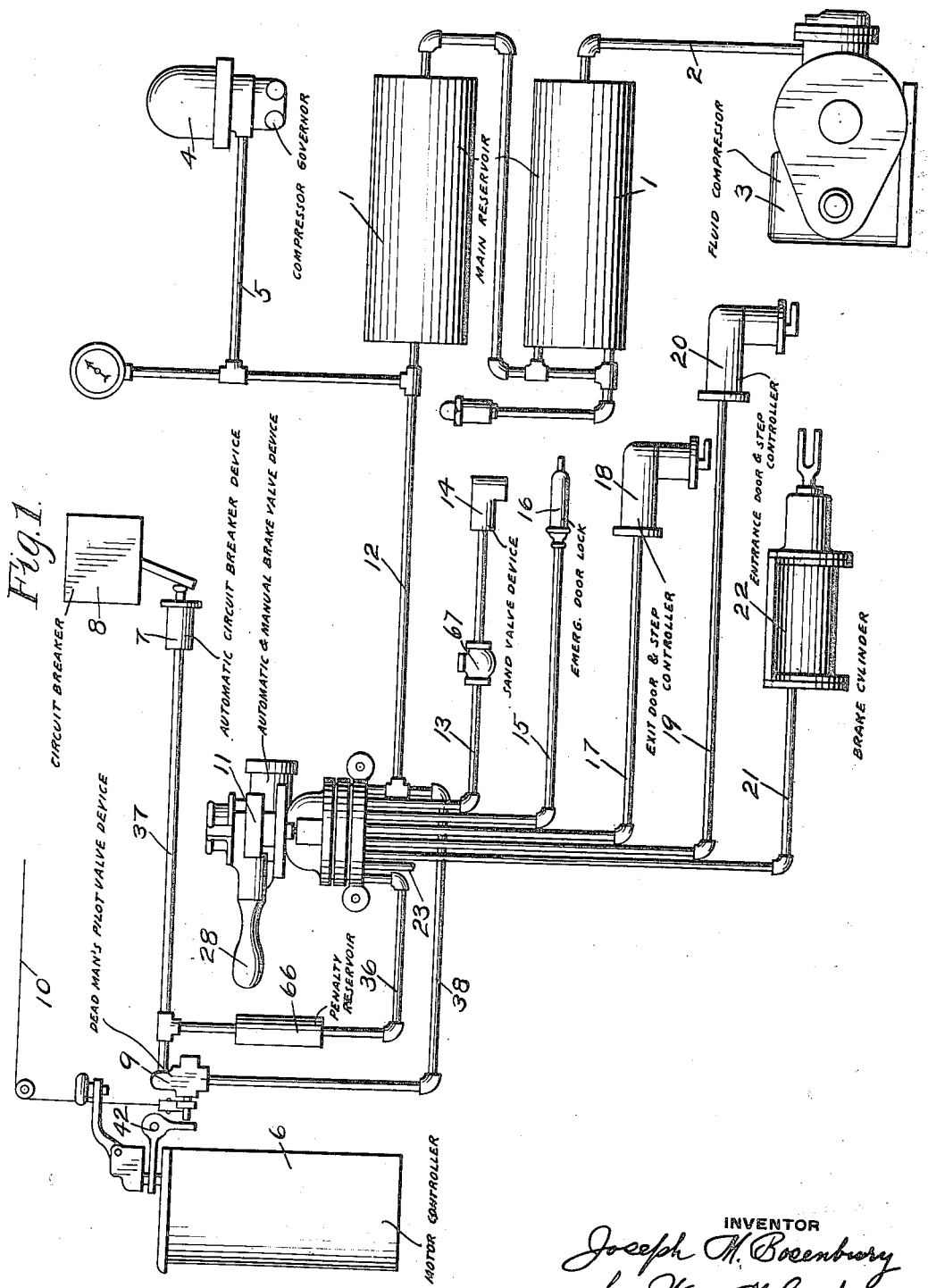

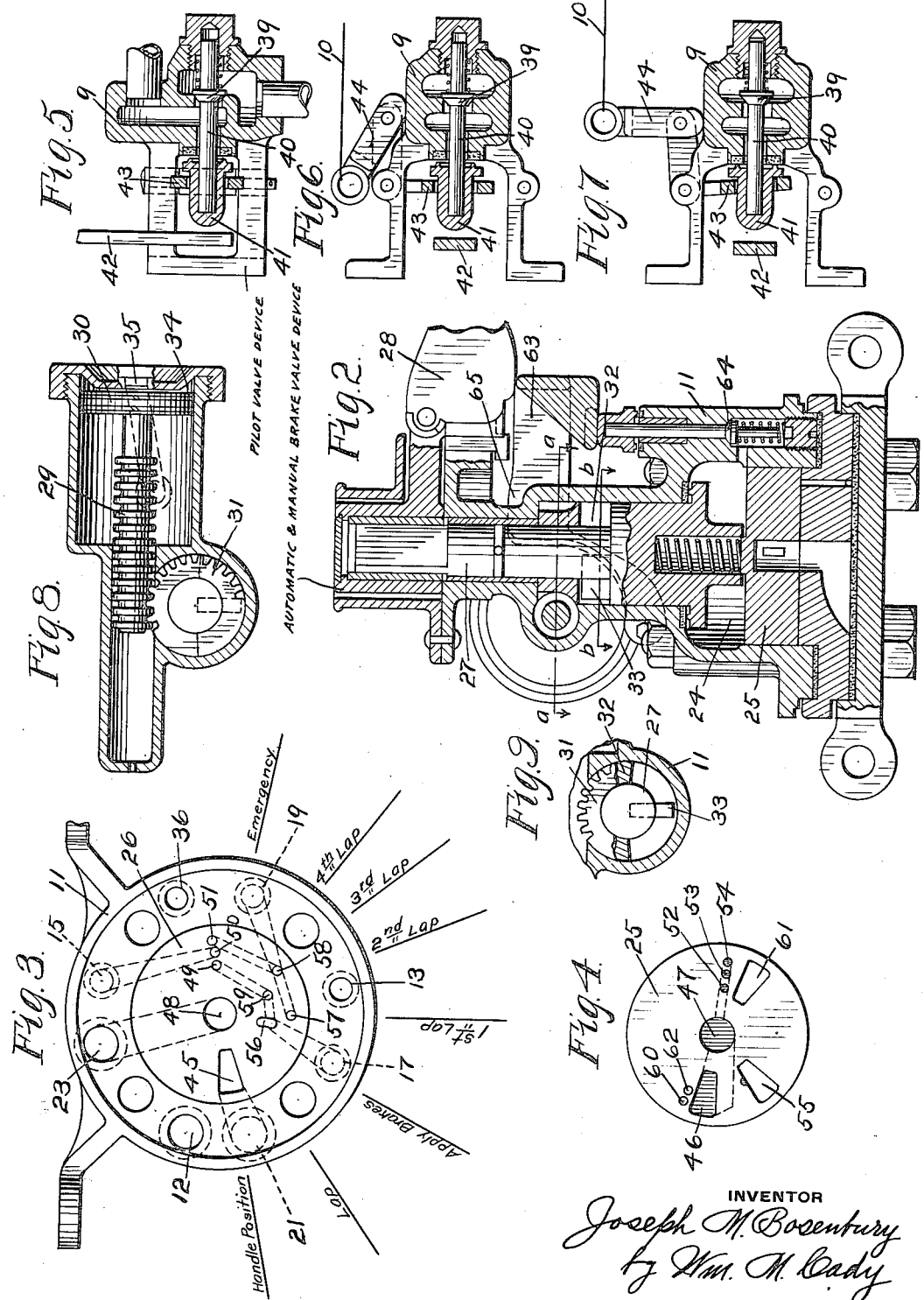

JOSEPH M. BOSENBURY, OF PEORIA, ILLINOIS, ASSIGNOR OF ONE-HALF TO CHARLES O. BIRNEY, OF MOUNT HEALTHY, OHIO.

STRAIGHT-AIR ONE-MAN EQUIPMENT.

1,297,437. Specification of Letters Patent. Patented Mar. 18, 1919.

Application filed November 23, 1915. Serial No. 62,986.

*To all whom it may concern:*

Be it known that I, JOSEPH M. BOSENBURY, a citizen of the United States, residing at Peoria, in the county of Peoria and State of Illinois, have invented new and useful Improvements in Straight-Air One-Man Equipments, of which the following is a specification.

This invention relates to safety car and brake apparatus, and more particularly to an equipment of the type adapted to be controlled by a single operator, known as the one-man car equipment.

One object of my invention is to provide an equipment of the above character adapted to be controlled by straight air.

Another object is to provide a brake valve device adapted to be automatically operated in an emergency to effect an application of the brakes.

Another object is to provide means for preventing the release of the brakes after an emergency application until a predetermined time has elapsed.

Still another object is to provide improved means for controlling the car doors and steps.

Other objects and advantages will appear in the following more detailed description of the invention.

In the accompanying drawings; Figure 1 is a diagrammatic view of a car equipment embodying my improvements; Fig. 2 a central vertical section of the brake valve device; Fig. 3 a plan view of the rotary valve seat of said brake valve device; Fig. 4 a face view of the rotary valve; Fig. 5 a central vertical sectional view of the pilot valve device; Fig. 6 a horizontal section thereof, showing the parts in normal position; Fig. 7 a view similar to Fig. 6, showing the parts in position upon operation by the emergency cord; Fig. 8 a section of the brake valve device on the line *a—a* of Fig. 2; and Fig. 9 a detail view, with the brake valve casing section on the line *b—b* of Fig. 2, showing the operating handle in full and the worm gear partly broken away.

According to a preferred form of my invention, as shown in Fig. 1 of the drawings, the car equipment may comprise the usual main reservoirs 1—1 connected by pipe 2 to a motor driven compressor 3, a compressor governor 4 subject to pump pressure supplied through pipe 5 for controlling the compressor, a controller 6 equipped with the so-called dead man's feature which may be of the character covered by my pending application Serial No. 39,296, filed July 12, 1915, an automatic device 7 which may be similar to that shown in the above mentioned patent application for operating a circuit breaker 8, a pilot valve device 9 adapted to be operated when the hand is removed from the controller handle, or by manipulation of an emergency cord 10 to effect the operation of the automatic device for controlling the circuit breaker and an application of the brakes, and a brake valve device 11 adapted to be operated manually in the usual manner or automatically upon operation of the pilot valve device 9.

The brake valve device has a main reservoir pipe 12, a pipe 13 leading to a sand valve device 14, a pipe 15 leading to an emergency door lock 16, a pipe 17 leading to an exit door and step controller 18, a pipe 19 leading to an entrance door and step controller 20, a pipe 21 leading to brake cylinder 22, and an exhaust pipe 23.

As shown more particularly in Figs. 2, 3, 4, 8 and 9 of the drawings, the brake valve device 11 may comprise a casing having a rotary valve chamber 24 containing a rotary valve 25 operating on a valve seat 26. The rotary valve may be operated manually in the usual way by a valve stem 27 carrying a brake valve handle 28 and also automatically, according to my invention.

For operating the brake valve automatically I preferably employ a rack 29 connected to a piston 30 and a coöperating pinion 31 which is rotatably mounted on the rotary valve stem 27, the rack having circular teeth, so as to permit rotative movement of the piston. The pinion is provided with a projecting portion 32 adapted to engage a key 33 secured in the valve stem 27 so that upon movement of the pinion by the rack, the rotary valve will be turned. It will be noted that the key 33 has a free movement of about 180 degrees in order to permit manual operation of the brake valve without interference of the automatic portion.

The chamber 34 at the outer face of piston 30 is connected by passage 35 with pipe 36 leading to the pilot valve device 9, so that fluid supplied by the pilot valve through pipe 37 to the circuit breaker controlling device 7 is also supplied to piston 30.

The pilot valve device 9 may comprise a casing containing a pilot valve 39 for controlling communication from a main reservoir supply pipe 38 to pipe 37. Applied to the outer end of the pilot valve stem 40 is a cap 41 adapted to be engaged by the rocker arm 42 of the dead man's device on the controller and having a flange adapted to be engaged by a rocker arm 43 which is operated through a cam lever 44 and the emergency cord 10.

In operation, the brakes and the car doors and steps are normally controlled by movement of the brake valve manually as follows: In the first or release position of the brake valve handle, a port 45 in the rotary valve seat, communicating with brake cylinder pipe 21, registers with a port 46 in the rotary valve which is connected by a cavity in the valve with a central exhaust port 47 constantly in communication through a port 48 with exhaust pipe 23.

It will thus be seen that in this position the brakes are released. In addition, ports 49, 50 and 51 also register respectively with ports 52, 53 and 54, the latter ports being connected by a cavity in the rotary valve with exhaust port 47. Ports 49, 50, and 51 are connected by cavities in the rotary valve seat respectively with exit door, emergency door, and entrance door pipes 17, 15, and 19, so that fluid is vented from the devices for controlling said doors and since these devices are designed to close the doors when fluid is vented therefrom, the doors will be closed when the brake valve is in release position.

If it is desired to effect an application of the brakes, the brake valve handle is turned to application position, in which a through port 55 in the rotary valve 25 registers with brake cylinder port 45. Fluid under pressure is thereupon supplied from the rotary valve chamber, which is open to the main reservoir, to the brake cylinder. All the door operating ports are lapped, in this position, so that the doors remain closed. If it is desired to open both the entrance and the exit doors, the brake valve handle is turned to the fourth lap position beyond application position, in which port 55 registers with ports 56 and 57, so that fluid is supplied to the pipes 17 and 19 and the doors are thereby opened by operation of the door controlling devices 20 and 18.

In the third lap position, port 46 registers with a port 58 and port 55 with port 56, so that fluid is supplied to open the exit door and vented to close the entrance door. In the second lap position, port 46 registers with port 59 and a through port 60 in the rotary valve with port 58, so that fluid is supplied to open the entrance door and vented to close the exit door.

In the first lap position, port 46 registers with ports 56 and 57, so that fluid is vented to close both the entrance and exit doors.

It will thus be seen that the doors can be operated at will while holding the brakes applied, and that by moving the brake valve handle to the proper lap position, both the entrance and exit doors may be simultaneously opened or closed, or one door may be opened and the other closed.

If the brake valve handle is turned to emergency position, a through port 61 in the rotary valve will register with brake cylinder port 45, so as to effect an application of the brakes, while ports 60 and 62 register with ports 51 and 50, and port 55 with port 59. Fluid is consequently supplied to the entrance, exit, and emergency door lock devices, so that all the doors are opened in this position.

It may here be stated that the entrance and exit doors are the ones normally used, the emergency door being employed only in an emergency to provide an additional exit in case of danger. The device 16 is merely a lock for the emergency door which when operated releases the emergency door but does not open same.

In order to sand the rails, a pivoted bail 63 is mounted on the brake valve and engages a valve 64 for supplying fluid to operate the sand controlling device 14 and the brake valve handle 28 is pivoted so as to permit of a vertical movement thereof, whereby upon depressing the brake valve handle in any position, the bail is operated to open the sand valve 64. In order to operate the sand valve automatically in emergency position, a slight incline 65 is provided on the bail 63, such that when the handle is turned to emergency position, the bail is depressed by the handle riding upon the incline.

The foregoing description has to do with the normal manual operation of the equipment, but in addition, an emergency application of the brakes and the opening of the doors may be effected automatically when the hand is released from the controller handle in any position except the off position or when the emergency cord is pulled.

When the hand is removed from the controller handle, the rocker arm 42 is caused to depress the pilot valve 39 by engagement with cap 41 and as a consequence, fluid is supplied from the main reservoir supply pipe 38 to pipe 37. This operates the automatic device 7 so that the switch of the circuit breaker 8 is thrown to open position and current is cut off. Fluid also passes through pipe 36 to the piston chamber 34 of the brake valve operating device, so that the piston 30 is actuated thereby to shift the rack 29 and thus effect the rotation of pinion 31. In this movement, the projecting portion of the pinion engages the key 33 and the rotary valve 25 is then turned to emergency position, so that an emergency application of the brakes is effected, the doors are opened and the rails are sanded, as in the case of manual operation of the brake valve. A penalty reservoir 66 is placed in the pipe 36, so that the release of the brakes can not be effected after an automatic emergency application until a predetermined time has elapsed.

This reservoir is of course charged with fluid under pressure when an automatic emergency application is made and before a release can be effected, the controller handle must be returned to release position, so as to operate the arm 42 and permit the pilot valve 39 to close and then fluid under pressure in piston chamber 34 and reservoir 66 must escape around the stem 40 past the unseated cap 41 before the piston 30 can return to release position, it being noted that the automatic brake valve controlling device when operated prevents the return of the brake valve handle to release position. When fluid has been vented from the piston 30, the brake valve handle may be returned to release position and the brakes released.

The automatic operation may be also effected by the emergency cord 10 which preferably extends through the full length of the car, so that the same can be manipulated at any point. When the cord is pulled, the cam lever 44 is moved to the position shown in Fig. 7 of the drawings, so that the rocker arm 43 is operated to depress the cap 41 and thus open the pilot valve 39. The automatic application of the brakes and the opening of the doors is then effected in the same manner as previously described where the hand is removed from the controller handle.

In order to prevent possible bleeding of fluid from the brake system after an emergency application through the sand valve pipe, a spring controlled check valve 67 adapted to close at a predetermined pressure, say 35 pounds, may be interposed in the pipe 13, so that when the pressure reaches 35 pounds or whatever pressure the check valve is adjusted to, the valve will close and prevent further flow to the sand valve device.

Having now described my invention, what I claim as new and desire to secure by Letters Patent, is:

1. The combination with a straight air brake valve device adapted to be manually operated for supplying fluid to the brake cylinder to effect an application of the brakes, of a controller and means operated upon removal of the hand from the controller handle for automatically operating said brake valve device to effect an application of the brakes.

2. The combination with a straight air brake valve device adapted to be manually operated for supplying fluid to the brake cylinder to effect an application of the brakes, of a fluid pressure operated device for automatically actuating said brake valve device, a controller, and means associated with said controller and operated upon removal of the hand from the controller handle for varying the fluid pressure on said automatic device.

3. The combination with a straight air brake valve device adapted to be manually operated for supplying fluid to the brake cylinder to effect an application of the brakes, of a fluid pressure controlled device associated with said brake valve device for automatically operating same, a controller, and a pilot valve device operated upon removal of the hand from the controller handle for varying the fluid pressure on said automatic device.

4. The combination with a straight air brake valve device adapted to be manually operated for supplying fluid to the brake cylinder to effect an application of the brakes, of a fluid pressure controlled device associated with said brake valve device for automatically operating same, a pilot valve device operative to vary the fluid pressure on said automatic device, and an emergency cord extending through the car for operating said pilot valve device.

5. The combination with a straight air brake valve device adapted to be manually operated for supplying fluid to the brake cylinder to effect an application of the brakes, of a fluid pressure controlled device associated with said brake valve device for automatically operating same, a controller, a pilot valve device operated upon removal of the hand from the controller handle for varying the fluid pressure on said automatic device, and an emergency cord extending through the car for also operating said pilot valve device.

6. The combination with a brake valve device for manually effecting an application of the brakes, of a controller, means for automatically effecting the operation of said brake valve device upon removal of the hand from the controller handle, and an emergency cord extending through the car for also operating said means.

7. The combination with a brake valve device for manually effecting an application of the brakes and a circuit breaker for controlling the electric current on the car, of a controller and means operated upon removal of the hand from the controller handle for operating said brake valve device and said circuit breaker.

8. The combination with a brake valve device for manually effecting an application of the brakes and a circuit breaker for controlling the electric current on the car, of a controller, means operated upon removal of the hand from the controller handle for operating said brake valve device and said circuit breaker, and an emergency cord extending through the car for also operating said means.

9. The combination with a brake valve device normally operated manually to effect an application of the brakes, of means operative in an emergency for automatically operating said brake valve device and means for preventing movement of said brake valve device to release the brakes until a predetermined period of time has elapsed.

10. The combination with a brake valve device normally operated manually to effect an application of the brakes, of a controller, means operated upon removal of the hand from the controller handle for automatically effecting the operation of said brake valve device and means for preventing movement of the brake valve device from application position to effect the release of the brakes until a predetermined period of time has elapsed.

11. The combination with a brake valve device normally operated manually to effect an application of the brakes, of a controller, means operated by fluid under pressure upon removal of the hand from the controller handle for effecting the automatic operation of the brake valve device, a restricted outlet being provided for the escape of fluid from said means to thereby prevent release movement of the brake valve device until a predetermined period of time has elapsed.

12. The combination with a brake valve device normally operated manually to effect an application of the brakes, of means operated in an emergency by fluid under pressure for effecting the automatic operation of said brake valve device and a penalty reservoir connected to said means, a restricted outlet being provided for the escape of fluid from said reservoir and said means to thereby prevent release movement of the brake valve device until a predetermined period of time has elapsed.

13. The combination with devices for operating a car entrance door, an exit door, and a door adapted to be employed in an emergency, of a valve device having ports for controlling the brakes and for controlling said car door operating devices.

14. The combination with devices for operating a car entrance door, an exit door, and a door adapted to be employed in an emergency, of a brake valve device having ports for controlling said car door operating devices.

15. The combination with devices controlled by fluid under pressure for operating a car entrance door, an exit door, and a door adapted to be employed only in an emergency, of a brake valve device having ports for controlling the fluid pressure on said devices.

16. The combination with devices controlled by fluid under pressure for operating a car entrance door, an exit door, and a door adapted to be employed only in an emergency, of a brake valve device for controlling the brakes and having ports for varying the fluid pressure on said devices and having one position for opening the entrance and exit doors, another position for closing both doors, other positions for closing one door and opening the other and still another position for opening both doors and for releasing said emergency door.

17. The combination with devices controlled by fluid under pressure for operating a car entrance door, an exit door, and a door adapted to be employed only in an emergency, of a manually operated valve device having ports for varying the fluid pressure on said devices and having one position for opening the entrance and exit doors, another position for closing both doors, other positions for closing one door and opening the other and still another position in which the brakes are applied and the entrance and exit doors opened and said emergency door released.

In testimony whereof I have hereunto set my hand.

JOSEPH M. BOSENBURY.